Feb. 1, 1966  F. A. LENNON ETAL  3,232,568

VALVE MOUNTING BRACKET

Filed July 23, 1963  2 Sheets-Sheet 1

INVENTORS
FRED A. LENNON,
EMERY J. ZAHURANEC,
ZOLTAN SZOHATZKY &
BY FRANK X. TERELL

Fay & Fay
ATTORNEYS

Feb. 1, 1966     F. A. LENNON ETAL     3,232,568
VALVE MOUNTING BRACKET
Filed July 23, 1963     2 Sheets-Sheet 2
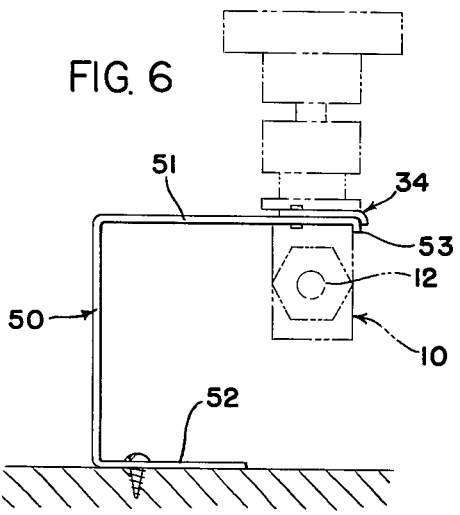
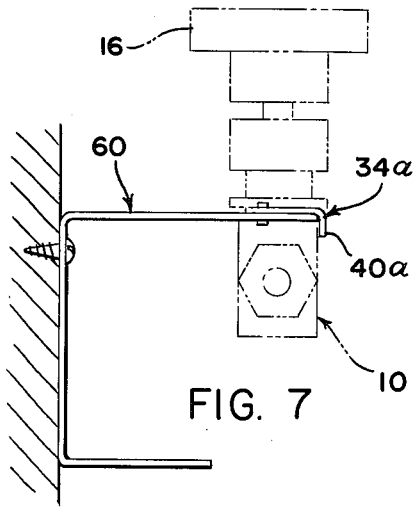
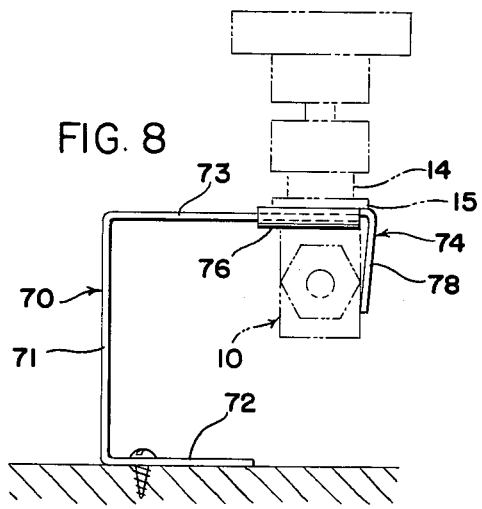
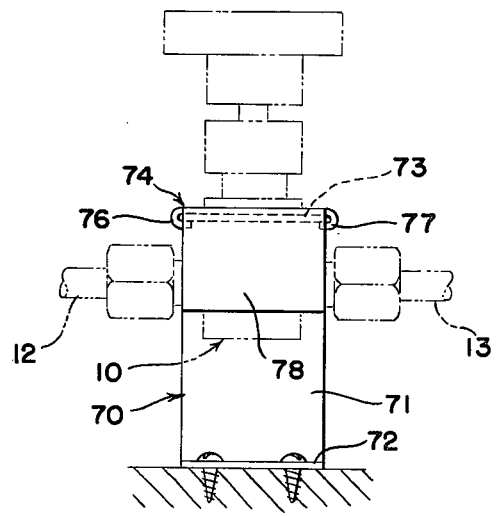
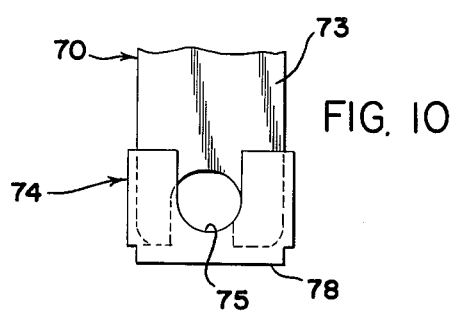
INVENTORS
FRED A. LENNON,
EMERY J. ZAHURANEC,
ZOLTAN SZOHATZKY &
FRANK X. TERELL
BY
Fay & Fay
ATTORNEYS United States Patent Office 3,232,568
Patented Feb. 1, 1966

3,232,568
VALVE MOUNTING BRACKET
Fred A. Lennon, Chagrin Falls, Emery J. Zahuranec, Bedford, and Zoltan Szohatzky, Euclid, Ohio, and Frank X. Terell, Ramsey, N.J., assignors to Whitey Research Tool Co., Oakland, Calif., a corporation of California
Filed July 23, 1963, Ser. No. 297,082
12 Claims. (Cl. 248—67)

This invention relates to a mounting bracket and more particularly to a bracket for mounting valves.

In most cases, the housing or body of a valve is provided with a cylindrical external boss through which the stem of the valve projects axially. It is common practice to provide this boss with an exterior threaded section upon which is carried a panel mounting nut. It is thereby possible to insert the threaded boss into an aperture of appropriate size provided in a panel or mounting bracket, tighten the mounting nut against the wall of the panel or bracket and clamp such wall between the nut and valve body to secure the valve in position.

A difficulty arises, however, in those instances in which the nut is not sufficiently tightened in that the valve, on opening and closing, is not precluded from twisting relative to the structure upon which it is mounted. Even should the nut be firmly tightened against the panel bracket wall initially, repeated stresses imposed on the valve during operation will tend to loosen the nut and permit dislocation of the valve. In the event the valve is secured in an open end slot, which is often true where a mounting bracket is utilized, loosening the nut may result in complete displacement of the valve from the slot and subsequent dismounting of the valve. The danger of twisting or complete dislocation of the valve lies, of course, in the attendant stress imposed upon the inlet and outlet lines. Such stress can, in time, be expected at best to cause leakage to occur at the points of connection between the lines and the valve; and at worst, these lines may rupture or otherwise fail.

By utilizing the underlying principles of the present invention, it becomes possible to bracket mount a valve in such a way as to secure against valve dislocation under the most severe conditions ordinarily imposed in normal application, and thereby avoid the difficulties inherent in known mounting arrangements.

It is an object of this invention to provide a valve mounting bracket.

It is a further object of this invention to provide a mounting bracket which can be used to secure a valve in a fixed position relative to the bracket.

It is a still further object of this invention to provide a valve mounting bracket that will firmly hold the valve in position despite the application of external forces from any direction.

It is another object of this invention to provide a valve mounting bracket that precludes the valve from twisting or becoming otherwise dislocated relative to the bracket.

It is still another object of this invention to provide a valve mounting bracket wherein the valve may be easily inserted into the bracket and readily removed therefrom but which resists external forces tending to remove the valve from the bracket.

Another object of this invention is to provide a valve mounting bracket which bracket may be secured to a support in a number of different positions and with minimum difficulty.

A further object of this invention is to provide a mounting bracket that may be easily fabricated but which is of a sturdy construction.

A more specific object of this invention is to provide a valve mounting bracket having a bayonet slot and a valve retaining plate cooperating therewith.

A more specific object of this invention is to provide a valve mounting bracket of a substantially U-shaped configuration with a bayonet slot provided in one leg of the U, the bayonet slot including a cut out or offset portion at the terminal end thereof with such portion being adapted to receive the cylindrical boss of a valve.

A still more specific object of this invention is to provide a valve mounting bracket having a bayonet slot including an offset or cut out portion, with both the bayonet slot and cut out portion adapted to receive the cylindrical boss of a standard valve and flange means oriented with the bayonet slot and cut out portion in a manner such that a valve received in the cut out portion is prevented from twisting relative to the valve mounting bracket.

To the accomplishment of the foregoing and related ends, said invention then consists of the means hereinafter fully described and particularly pointed out in the claims, the following description setting forth in detail only a few of the approved means of carrying out the invention, such disclosed means, however, constituting but a few of the various ways in which the principles of the invention may be used.

In the drawings:

FIG. 6 is a side elevation of an alternative valve mounting bracket.

FIG. 7 is a side elevation of another alternative valve mounting bracket illustrating the bracket mounted in a vertical position.

FIG. 8 is a side elevation of a further alternative valve mounting bracket.

FIG. 9 is a front elevation view of the alternative bracket of FIG. 8.

FIG. 10 is a partial plan view of the valve receiving portion of the alternative bracket of FIG. 8.

Figure 1:
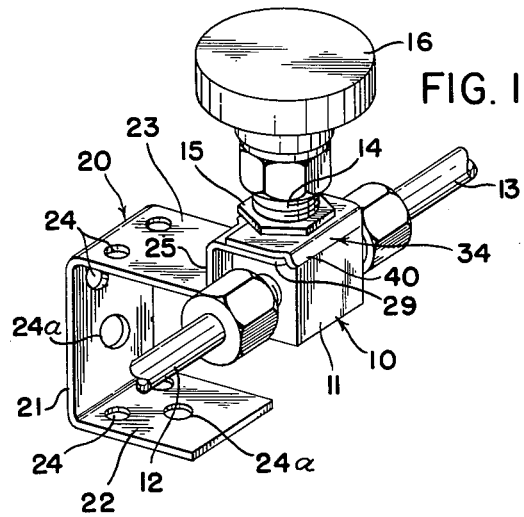
FIG. 1 is a perspective view of a preferred embodiment of the invention illustrating a valve received in the bracket.

Turning now to the drawings wherein like reference numerals indicate like parts in the various views, the reference numeral 10 indicates one type of valve which is adapted to be received in the valve mounting bracket of this invention. This valve, as shown in FIG. 1, comprises a body portion 11 and inlet and outlet lines 12, 13 respectively. Projecting from the body portion 11 is a boss 14 having threads thereon and adapted to receive a mounting nut 15. An operating handle 16 is connected to a valve stem (not shown) which extends axially through the boss 14.

As is apparent from an inspection of FIG. 1, the valve is mounted in a bracket indicated generally by the reference numeral 20. The bracket 20 is of a substantially U-shaped configuration having a base portion 21 and legs 22, 23 projecting from either end. In both legs 22, 23 and the base 21 are provided mounting holes 24 adapted to receive suitable fasteners with additional mounting holes 24a, of a different size, in boss 21 and legs 22. In this way, it is possible to mount the bracket in any one of a number of different positions depending upon the particular application to which the valve and bracket are to be put.

Figure 3:
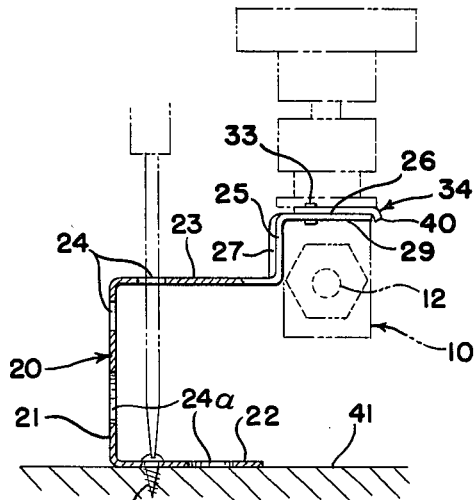
FIG. 3 is a side elevation of the embodiment of FIG. 1.
Figure 2:
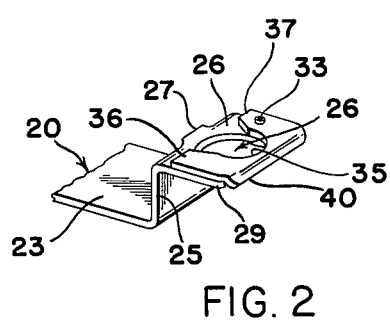
FIG. 2 is a partial perspective view of the embodiment of FIG. 1 showing the valve receiving portion of the bracket.

As viewed in FIG. 3, the leg 23 is longer than the leg 22 and includes a vertically transverse portion 25 and a valve receiving platform 26 parallel to the legs 22, 23. A rib 27 is formed in the vertical portion 25.

Figure 5:
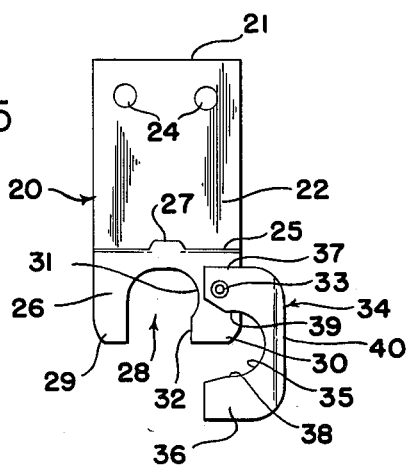
FIG. 5 is a plan view of the embodiment of FIG. 1 with the clamping plate pivoted to an open position.

As best shown in FIG. 5, there is formed in the valve platform 26 a slot 28 of a dimension adapted to receive the boss of the valve 10. The slot 28 divides the platform 26 into two supporting fingers 29, 30 with the position of the slot in the platform 26 being such that the width of finger 29 is less than the width of finger 30.

At the inner terminus of the slot 28, an enlarged, cut out portion or pocket 31 is formed with the cut out 31 being transversely oriented relative to the longitudinal axis of the bracket and slot 28, thus causing the cut out 31 to have an eccentric relationship to the slot 28 and comprises a bayonet opening. This eccentric relationship forms a projection 32 at the outer end of finger 30 which functions in a manner hereinafter described.

With the slot and cut out arrangement, the valve may be inserted in the slot 28 and moved rearwardly in the slot to the cut out 31 where the boss 14 would be loosely received. By threading the mounting nut 15 down the boss 14 into engagement with the upper surface of platform 26 thereby clamping the platform between the nut 15 and the valve body 11, the valve 10 would be secured to the bracket 20 and supported thereby. The depth of the slot and cut out arrangement is such that with the boss 14 fully received in the cut out 31, the valve body 11 is closely adjacent to the vertical portion 25 of the leg 23. Assuming the valve is retained in the cut out 31, it is believed apparent that any tendency of the valve to twist or rotate relative to the bracket 20 will be restrained by the valve body 11 abutting the vertical portion 25.

However, it also is believed apparent that whether or not the valve is retained in the cut out 31 with only the structure so far recited is dependent upon the degree of tightness of the mounting nut 15. If the nut 15 is not fully tightened, or if repeated stresses have loosened the nut, the valve will be susceptible to displacement relative to the bracket and the desired support will not be obtained.

Figure 4:
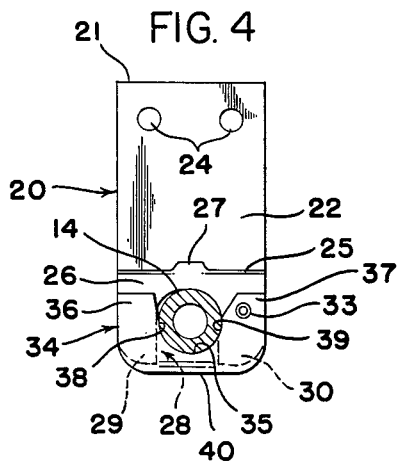
FIG. 4 is a plan view of the embodiment of FIG. 1 showing the cylindrical boss received in the offset cut out portion.

To obviate the necessity for a critical relationship between the nut 15 and the platform 26, there is secured to the platform by appropriate means, such as the rivet 33, a valve retainer plate as designated generally by the reference numeral 34. The plate 34 has the same general dimensions as the platform 26 and is designed to overlie the platform. A slot 35 is provided in the plate 34 and is of a dimension identical to the slot 28. However, unlike slot 28, the slot 35 is disposed centrally of the plate 34 and divides the plate into two fingers 36, 37 having equal dimensions with the rivet 33 passing through finger 37. Thus, with the plate 34 superimposed on the platform 26, the side 38 of the slot 35 overlies a portion of the slot 28 while the side 39 coincides with the lateral or transverse extremity of the cut out 31. This is best illustrated in FIG. 4.

The combination of the overlapping grooves 28, 35 and the pocket or cut out 31 constitutes a positive lock for the valve 10 and prevents the valve from being pulled outwardly of the slot 28 regardless of the tightness of nut 15. This is more easily understood by an examination of FIG. 4 wherein the boss 14 is shown as being disposed in the cut out 31 of the platform portion 26. This position is attained by the side 38 of the slot 35 acting as a camming surface to displace the boss 14 laterally as the plate 34 is pivoted into an overlying relationship with the platform 26. The result is that the boss 14 is restrained in the cut out 31, behind the projection 32 on the finger 30, so that any force exerted on the valve 10 in a direction tending to move it outwardly of the slot 28 is restrained by the projection 32. Further, the side 38 of the slot 35 prevents the valve 10 from being displaced laterally from the cut out portion 31.

It is believed apparent, therefore, to remove the valve from the bracket, it first is necessary to pivot the plate 34 to the position of FIG. 5 thus removing the restraint which retains the boss 14 behind the projection 32. With the plate 34 removed, the boss 14 may be displaced out of the pocket 31 to a position clear of the projection 32 whereupon the valve may be moved along the slot 28 out of the bracket.

In order to provide structural rigidity of the valve plate 34, there is provided on one edge thereof a downwardly turned flange 40. The flange 40 also constitutes a means by which the plate may be grasped to facilitate the pivoting movement relative to the platform 26.

The bracket of FIG. 1 may be mounted on a support or bulkhead 41 by appropriate fasteners 42. The holes 24 on the legs 22, 23 are in vertical alignment so that a screwdriver or other appropriate tool may be received in one of the holes while inserting the fastener in the holes of the other leg. This is illustrated in FIG. 3 wherein a portion of a screwdriver is shown in phantom.

Turning to FIG. 6, there is illustrated a bracket 50 which is a modification of the embodiment of FIG. 1 but which includes essentially the same elements as the bracket of FIG. 1. However, the upright portion 25 of the bracket 20 has been eliminated so that the upper leg 51 is similar in configuration to the lower leg 52. The plate 34 is the same as the plate 34 in the FIG. 1 embodiment. An additional feature is added in the FIG. 6 embodiment in that the extreme outer edges of the fingers of the upper leg 51 include downturned portions 53 which serve as a means for preventing rotation of the valve 10 relative to the bracket 50 in a manner similar to the portion 25 on the bracket 20. In all other respects, including the overlapping slots and cut out portion, the bracket 50 is the same as bracket 20 and functions in the same manner.

A further modification is illustrated in FIG. 7 wherein the bracket 60 is of a configuration identical to that of FIG. 6 with the exception that the downturned edges 53 of the upper leg 51 of the bracket 50 have been removed. However, the valve 10 is still restrained from any pivotal movement relative to the bracket 60 due to the presence of flange 40a on the plate 34a. The embodiment of FIG. 7 also illustrates the versatility of the bracket in that it may be mounted by fasteners passing through the apertures in the base portion of the bracket.

The modification of FIG. 8 illustrates a bracket 70 having the same frame configuration as the bracket 50 of FIG. 7 including a base 71, and legs 72, 73. However, the clamping plate has been modified. Thus, the plate 74 comprises a base portion having a slot 75 in the manner of the pivoted plate 34 but designed to slide over, instead of pivot on, the upper leg 73 of the bracket 70. As shown in FIG. 9, the opposite sides of the plate 74 include inwardly turned portions 76, 77 adapted to engage the leg 73 and serve as guide means for the sliding movement of the plate 74. The end of the plate 74 opposite to the slot 75 is bent downwardly in the form of a depending leg 78 and is a counterpart to the flange 40a on the pivoted plate 34a. However, the leg 78, as shown, is of a considerably greater extent than the flange 40a and provides a more positive action in restraining the valve 10 from rotating relative to the bracket 70. The function of the plate 74 is identical to that of the plate 31 and varies therefrom only in that the plate 74 slides over the leg 73 as opposed to the pivoting action of the plate 31.

The manner in which the plate 74 is received on the leg 73 is not critical. Thus the plate 74 may be received in a position underlying the leg 73 as opposed to the overlying relationship shown. To accomplish this change, it is obvious that the guide means 76, 77 need only be reversed. Additionally, the plate 74, with the guide means 76, 77 reversed, may be received on the leg 73 with the depending leg 78 to the rear of the valve and the slot 75 opening outwardly in the same manner as the slot in the leg 73.

It is believed apparent, in view of the embodiments illustrated and discussed above, that the invention herein disclosed satisfies each of the objects set forth. Thus, a valve mounted in the bracket is restrained from pivoting movement relative to the bracket and does not depend upon the degree of engagement between the nut on the valve and the valve mounting bracket. Further, the cooperating slots provided on the bracket result in a means that effectively restrains the valve from being pulled out of the slots, once again irrespective of the degree of tightness of the nut on the bracket. With an arrangement such as that illustrated, it is obvious that a valve may be inserted in the bracket with greater ease and less time due to the inherent restraining characteristics of the bracket itself.

Although several embodiments have been shown and discussed in connection with the instant invention, such embodiments are not to be construed as being exhaustive, but rather as being purely illustrative of the principles contemplated. It is entirely within the contemplation of this invention to utilize only the overlapping slotted arrangement illustrated for the benefits flowing therefrom and removing the flanges which prevent the turning of the valve relative to the bracket or to use various other combinations of flanges and slots. Thus, for ease of description, the principles of the invention have been set forth in connection with but a few illustrated embodiments. It is not our intention that the illustrated embodiments or the terminology employed in describing them be limiting inasmuch as variations of them may be made without departing from the spirit of the invention, but rather, it is our desire to be restricted only by the scope of the appended claims.

We claim:

1. A valve mounting bracket comprising;
   an elongated support member;
   said member including a slot opening outwardly of one end thereof and adapted to receive the cylindrical boss of a valve;
   said member further including a cut out portion extending transverse to said slot at one side of the inner terminus thereof and being adapted to receive the boss of a valve;
   a retaining plate having a slot opening outwardly of one end thereof and being of the same dimension as the slot in said support member;
   said plate being received on said support member with one side of the slot in said plate coinciding with an edge of the cut out portion in said member with the slots in overlying relation.

2. The bracket of claim 1 including;
   means pivotally securing said plate to said support member.

3. The bracket of claim 1 including;
   means on at least one of said support member and plate operable to cooperate with a valve mounted on said support member thereby to restrain rotation of the valve relative to said support member.

4. A bracket adapted for supporting a valve comprising;
   a support member;
   said member including a base portion with legs projecting from opposite ends thereof transverse to said base portion;
   each of said legs and base portion having mounting holes disposed therein with the holes in said legs being in alignment;
   one of said legs including a slot opening outwardly of one end thereof and adapted to receive the cylindrical boss of a valve;
   said one leg further including a cut out portion extending transverse to the slot at the inner terminus thereof and being adapted to receive the boss of a valve;
   a retaining plate having a slot opening outwardly of one end thereof and being of the same dimensions as the slot in said one leg;
   said plate being received on said one leg with one side of the slot in said plate coinciding with an extremity of the cut out portion in said one leg and the other side of the slot in said plate disposed over the slot in said one leg.

5. A mounting bracket adapted to support a valve comprising;
   a support member;
   said member including a base portion with spaced apart legs projecting from opposite ends thereof transverse to said base portion;
   each of said legs and base portion having mounting holes disposed therein with the holes in said legs being in alignment;
   one of said legs including a bifurcated slot adapted to receive the boss on a valve whereby the body of the valve is disposed between said legs;
   means on said one leg for retaining the boss in said slot;
   and further means on said one leg for preventing rotation of the valve relative to said one leg when the boss on the valve is retained in the slot.

6. A mounting bracket adapted to support a valve comprising;
   a support member;
   said member including a base portion with legs projecting from opposite ends thereof;
   a valve receiving platform;
   said platform being spaced from one of said legs but being connected thereto by a member extending transversely of said leg;
   said platform including a slot opening outwardly of one end thereof and adapted to receive the boss on a valve;
   said platform further including a cut out portion extending transverse to the slot at the inner terminus thereof and being adapted to receive the boss of a valve;
   a retaining plate having a slot of the same dimensions as the slot in said one leg opening outwardly of one end thereof;
   said plate being received on said platform with one side of the slot in said plate coinciding with an extremity of the cut out portion in said platform and the other side of the slot in said plate disposed over the slot in said platform.

7. The bracket of claim 6 wherein said plate includes a depending flange along one edge thereof adapted to cooperate with the valve thereby to prevent rotation of the valve relative to the mounting bracket.

8. A valve mounting bracket bracket comprising;
   a support member;
   said member including a slot opening outwardly of one end thereof and adapted to receive the cylindrical boss on a valve;
   said member further including a cut out portion extending transverse to said slot at one side of the inner terminus thereof and being adapted to receive the boss on a valve; and
   means on said support member adapted to cooperate with the slot opening and cut out portion whereby the stem of a valve received in the slot in said member is displaced and retained in the cut out portion therein.

9. A valve mounting bracket comprising;
   a support member;
   said member including a slot opening outwardly of one end thereof and defining a bifurcated portion having spaced apart fingers;
   one of said fingers having a greater width than the other of said fingers;
   said member further including a cut out portion extending transverse to said slot at the inner terminus thereof and being adapted to receive the boss on a valve;

a retaining plate having a slot opening outwardly of one end thereof and defining a bifurcated portion having spaced apart fingers;

the slot in said plate being of the same dimension as the slot in said member with the width of the retaining plate being the same as the width of said member;

the fingers of said bifurcated portion of said retaining plate being of an equal dimension;

said plate being receivable on said support member with the edges of said plate coinciding with the edges of said support member in a manner whereby one side of the slot in said plate coincides with an extremity of the cut out portion in said support member;

the other side of said slot in said plate is disposed over the slot in said support member.

10. The bracket of claim 9 including;

means on said support member operable to cooperate with a valve mounted on said support member thereby to restrain rotation of the valve relative to said support member.

11. The bracket of claim 9 including;

means on said plate operable to cooperate with a valve mounted on said support member thereby to restrain rotation of the valve relative to said support member.

12. The bracket of claim 9 including;

means on said plate for guiding said plate in sliding movement on said support member.

References Cited by the Examiner

UNITED STATES PATENTS

| 1,064,117 | 6/1913 | Adreon | 248—67 |
| 1,125,811 | 1/1915 | Burnett | 248—67 |
| 1,282,753 | 10/1918 | Carwalho | 248—312 |
| 1,808,516 | 6/1931 | Bartsch | 248—67 |
| 2,633,323 | 3/1953 | Burger | 248—312 |

M. CARY NELSON, *Primary Examiner.*

HENRY T. KLINKSIEK, *Examiner.*